H. Leslie,
Water Tube Boiler.
No. 3904. Reissued Apr. 5. 1870.
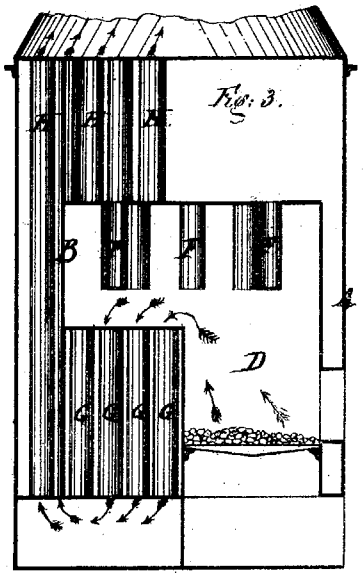
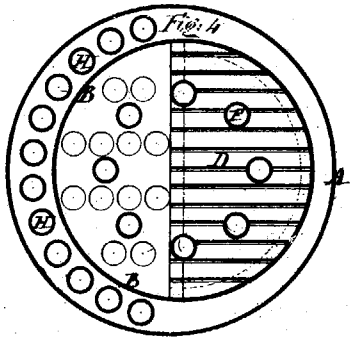
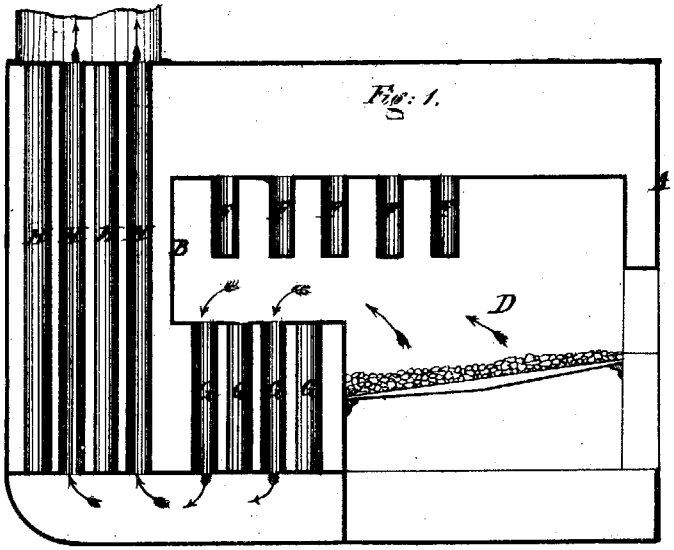
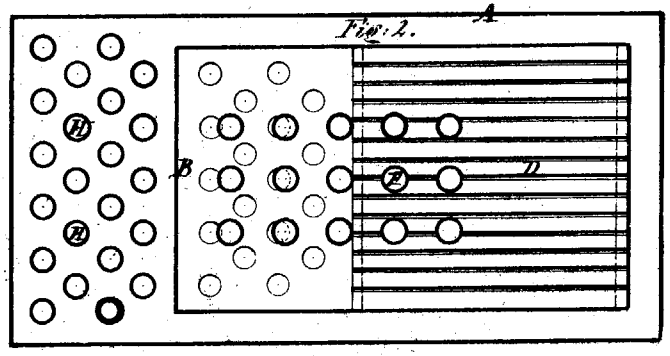
Witnesses
Philip R. Forrest
F. R. Forrest
Hugh Leslie Inventor
N. PETERS, PHOTO-LITHOGRAPHER, WASHINGTON, D. C.

United States Patent Office.

HUGH LESLIE, OF JERSEY CITY, NEW JERSEY.

*Letters Patent No.* 43,417, *dated July* 5, 1864; *reissue No.* 3,904, *dated April* 5, 1870.

IMPROVEMENT IN STEAM-BOILERS.

The Schedule referred to in these Letters Patent and making part of the same

*To all whom it may concern:*

Be it known that I, HUGH LESLIE, of Jersey City, New Jersey, have invented a new and useful Improvement in Steam-Boilers, of which the following is a description, reference being had to the accompanying drawings making a part thereof, in which—

Figure 1 is a side sectional elevation of a marine boiler.

Figure 2 is a plan or horizontal section of the same.

Figure 3 is a side elevation of a stationary boiler.

Figure 4 is a plan or horizontal section of the same.

It is obvious that these drawings exhibit an arrangement of boilers which is capable of being applied to any of the forms in which boilers may be made, simply by the exercise of the ordinary skill of the constructor, and that the usual methods of bracing and riveting are applicable to it.

Before the date of my invention, boilers were constructed having a number of vertical fire-tubes, so controlled by a damper or partition that the products of combustion descended through a part of them, and ascended through another part of them, in their passage from the furnace to the up-take. These boilers were known by the name of Boardman's boilers, and were used to a small extent on steamboats, locomotives, and stationary engines some years since; but they have gone out of use, and I do not now know of one remaining in service. I have overcome the defects which rendered these boilers comparatively useless, and in my new construction and arrangement of descending and ascending tubes consists my invention.

In the Boardman boilers the products of combustion, after leaving the fuel, passed through a horizontal rectangular flue, in the bottom sheet of which the tubes were fixed, leading downward into an ash-pan or lower connection; and, in order to bring these tubes into action, a partition was set up in the horizontal flue which interrupted the passage of the gases through it. This partition was placed somewhere in the space which the tubes occupied in the lower sheet of the flue; and, if it were set up nearer to the furnace than the middle of the tube-space, it would leave less than half of the tubes open to the descending current of gases, and more than half would be open to the ascending current; and so, by shifting the partition, the proportion between the number of descending tubes and of ascending ones would be varied, and by dropping the partition like a damper the tubes would cease to be useful, and the gases would pass directly to the up-take without descending through them.

In my improved boiler the horizontal flue is terminated by a water wall at a point beyond the space occupied by the descending tubes, and before the ascending tubes are reached, so that the ascending tubes can be carried up above the level of the tops of the descending tubes, instead of being limited to the height of the descending tubes, as in the old arrangement. By this arrangement there is no limit, except the size of the boiler, to the height of the ascending tubes, and they may be used as superheaters, or may be terminated in an open chamber below water, as is usual with vertical tubular boilers, in the discretion of the constructor.

In my arrangement, also, the ascending tubes are placed in a cluster behind the descending ones, and do not surround them in a concentric circle, as has been suggested by G. G. Dennis and W. S. Hudson's withdrawn application.

The advantage of my arrangement is, that I am enabled to have a cluster of tubes together, both in ascending and descending, whereby the gases are kept in mass, and a much greater amount of heating-surface is attained in the same cubic contents.

In the drawing—

D is the fire-box, which opens into the horizontal flue;

B is the inside end of that flue, and has water behind it;

G G are the descending tubes, and

H H the ascending ones, both opening into a connection below.

A is the outer shell of the boiler, and

F F are closed tubes, projecting into the furnace and flue, which are upon a well-known plan, and form no part of this invention, and may be dispensed with, if preferred.

The tubes H H must be long enough to rise above the tops of the tubes G G, but their precise length must depend upon the space which can be afforded, and also upon the nature of the uses of the steam. If superheated steam is desired, as it usually is, the tubes should be long enough to pass through the steam-room of the boiler; if not, they may terminate below the water-level in a fire-connection.

What I claim as my invention, and desire to secure by Letters Patent, is—

A vertical tubular boiler, in which the products of combustion pass successively through descending and ascending fire-tubes, so arranged and constructed that the main flue is terminated by a water wall behind the space occupied in its bottom sheet by the descending tubes, and having the upper ends of the ascending tubes terminating at a level higher than the upper ends of the descending tubes, when the said boiler is constructed and arranged with the ascending tubes placed in a cluster behind the descending ones, substantially as described.

HUGH LESLIE.

Witnesses:

PHILIP R. FORREST,

J. R. FORREST.